United States Patent
Bulgakov et al.

(12)

(10) Patent No.: US 10,972,473 B2
(45) Date of Patent: *Apr. 6, 2021

(54) TECHNIQUES TO AUTOMATICALLY UPDATE PAYMENT INFORMATION IN A COMPUTE ENVIRONMENT

(71) Applicant: Capital One Services, LLC, McLean, VA (US)

(72) Inventors: Mykhaylo Bulgakov, Arlington, VA (US); Taurean Butler, Brooklyn, NY (US); William F. Carroll, II, Huntingtown, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,177

(22) Filed: Nov. 25, 2019

(65) Prior Publication Data

US 2020/0382514 A1    Dec. 3, 2020

Related U.S. Application Data

(63) Continuation of application No. 16/423,939, filed on May 28, 2019, now Pat. No. 10,523,681.

(51) Int. Cl.
| | |
|---|---|
| *H04L 29/06* | (2006.01) |
| *G06N 20/00* | (2019.01) |
| *G06F 16/951* | (2019.01) |
| *H04L 12/14* | (2006.01) |
| *G06Q 20/40* | (2012.01) |
| *G06F 12/14* | (2006.01) |

(52) U.S. Cl.
CPC ......... *H04L 63/102* (2013.01); *G06F 16/951* (2019.01); *G06N 20/00* (2019.01); *G06F 12/14* (2013.01); *G06Q 20/405* (2013.01); *H04L 2209/56* (2013.01)

(58) Field of Classification Search
CPC ....... H04L 29/06; H04L 63/102; H04L 12/14; H04L 2209/56; G06N 20/00; G06F 16/951; G06Q 20/405
See application file for complete search history.

(56) References Cited

U.S. PATENT DOCUMENTS

| | | | | |
|---|---|---|---|---|
| 7,599,856 | B2 * | 10/2009 | Agrawal ................ | G06Q 20/00 705/26.8 |
| 10,007,810 | B2 * | 6/2018 | Magistrado ............ | G06F 21/84 |
| 2005/0270372 | A1 * | 12/2005 | Henninger, III ... | G06K 9/00771 348/143 |
| 2007/0219910 | A1 * | 9/2007 | Martinez ................ | G06F 21/10 705/51 |
| 2010/0095219 | A1 * | 4/2010 | Stachowiak ........ | G06F 16/9562 715/745 |

(Continued)

OTHER PUBLICATIONS

International Search Report and Written Opinion for International Patent Application No. PCT/US2020/034900 dated Aug. 21, 2020, 10 pages.

*Primary Examiner* — Jayesh M Jhaveri
(74) *Attorney, Agent, or Firm* — Kacvinsky Daisak Bluni PLLC

(57) ABSTRACT

Various embodiments are generally directed to techniques for generating rules automatically navigate a website and perform updates of payment token information.

20 Claims, 16 Drawing Sheets

(56) References Cited

U.S. PATENT DOCUMENTS

| | | | |
|---|---|---|---|
| 2012/0209778 A1* | 8/2012 | Delany | H04L 63/0442 705/75 |
| 2015/0310562 A1* | 10/2015 | Chourasia | G06Q 40/00 705/30 |
| 2016/0148177 A1* | 5/2016 | Best | G06Q 20/363 705/65 |
| 2016/0301683 A1* | 10/2016 | Laxminarayanan | G06Q 20/027 |
| 2018/0330367 A1* | 11/2018 | Sharma | G06Q 20/3274 |
| 2019/0188421 A1* | 6/2019 | Meira Pires de Azevedo | G06F 21/6218 |
| 2020/0213310 A1* | 7/2020 | Ju | H04L 63/0876 |

* cited by examiner

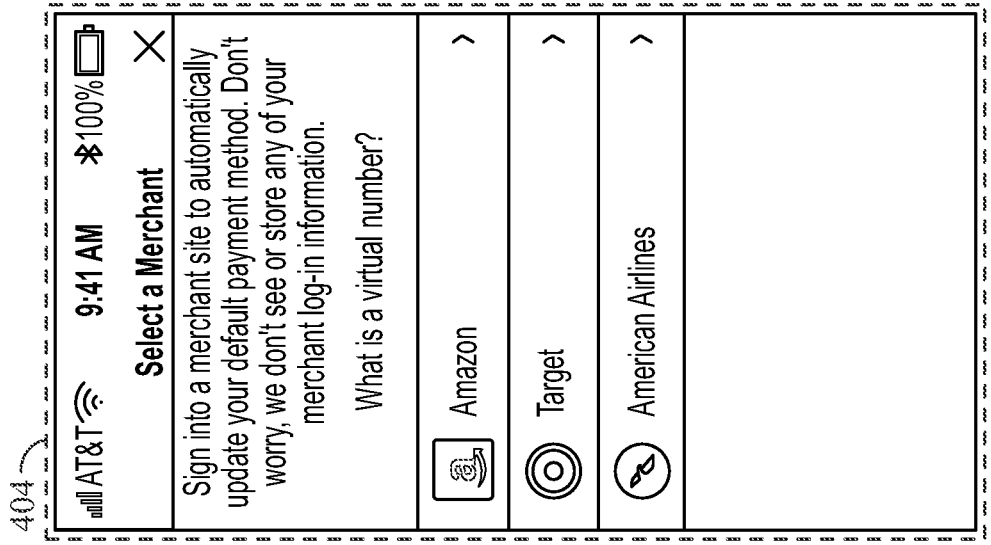
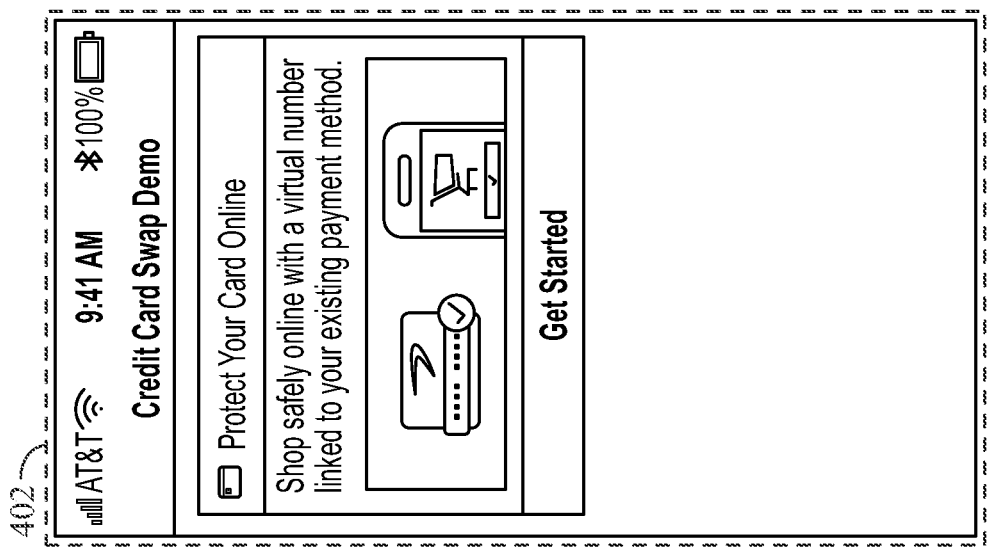
FIG. 4A

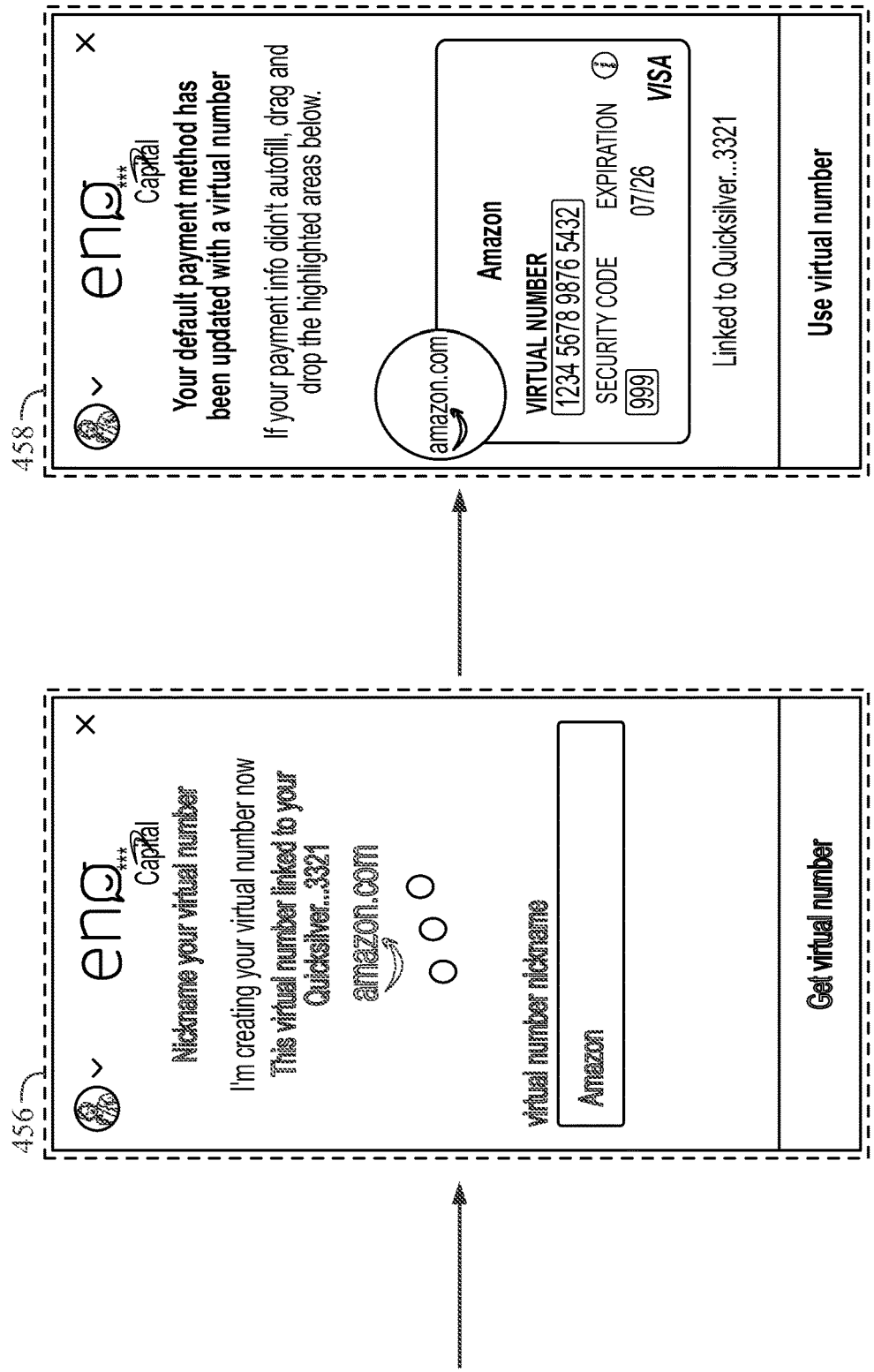

500

RECEIVING AN INDICATION TO CHANGE PAYMENT TOKEN INFORMATION ASSOCIATED WITH A WEBSITE
505

GENERATING ONE OR MORE RULES TO AUTOMATICALLY NAVIGATE TO A WEBPAGE TO CHANGE THE PAYMENT TOKEN INFORMATION BASED ON AN ANALYSIS OF ONE OR MORE WEBPAGES OF THE WEBSITE
510

STORING THE ONE OR MORE RULES IN A NAVIGATION FILE TO PERFORM A CHANGE IN PAYMENT TOKEN INFORMATION, THE NAVIGATION FILE COMPRISING THE ONE OR MORE RULES TO AUTOMATICALLY NAVIGATE THE WEBSITE TO THE WEBPAGE TO CHANGE THE PAYMENT TOKEN INFORMATION IN RESPONSE TO BEING INITIATED
515

INITIATING THE NAVIGATION FILE TO CAUSE PERFORMANCE OF THE ONE OR MORE RULES AND NAVIGATE TO THE WEBPAGE TO CHANGE THE PAYMENT TOKEN INFORMATION
520

CAUSING A CHANGE IN THE PAYMENT TOKEN INFORMATION
525

```
RECEIVE AN INDICATION TO CHANGE PAYMENT TOKEN
INFORMATION ASSOCIATED WITH A WEBSITE COMPRISING
ONE OR MORE WEBPAGES
545
```

```
INITIATE A SCRIPT COMPRISING ONE OR MORE RULES TO
CAUSE PERFORMANCE OF ONE OR MORE ACTIONS TO
NAVIGATE TO A WEBPAGE OF THE ONE OR MORE
WEBPAGES OF THE WEBSITE TO CHANGE THE PAYMENT
TOKEN INFORMATION
550
```

```
AUTOMATICALLY NAVIGATE TO THE WEBPAGE TO CHANGE
THE PAYMENT TOKEN INFORMATION
555
```

```
AUTOMATICALLY CHANGE THE PAYMENT TOKEN
INFORMATION WITH NEW PAYMENT TOKEN INFORMATION
560
```

```
CRAWL ONE OR MORE WEBPAGES OF A WEBSITE TO
GENERATE ONE OR MORE RULES TO AUTOMATICALLY
NAVIGATE TO A WEBPAGE TO CHANGE PAYMENT TOKEN
INFORMATION ASSOCIATED WITH THE WEBSITE
585
```

```
STORE THE ONE OR MORE RULES IN A NAVIGATION FILE TO
CHANGE PAYMENT TOKEN INFORMATION, THE NAVIGATION
FILE, IN RESPONSE TO BEING INITIATED, TO CAUSE
PERFORMANCE OF THE ONE OR MORE RULES TO
AUTOMATICALLY NAVIGATE TO THE WEBPAGE TO CHANGE
PAYMENT TOKEN INFORMATION
590
```

FIG. 5C

TECHNIQUES TO AUTOMATICALLY UPDATE PAYMENT INFORMATION IN A COMPUTE ENVIRONMENT

RELATED APPLICATIONS

This application is a continuation of U.S. patent application Ser. No. 16/423,939, entitled "TECHNIQUES TO AUTOMATICALLY UPDATE PAYMENT INFORMATION IN A COMPUTE ENVIRONMENT" filed on May 28, 2019. The contents of the aforementioned application is incorporated herein by reference.

BACKGROUND

The list of companies involved in data breaches is seemingly endless and continuing to grow. And that's just the data breaches that make national news; many never come to light. These breaches occur to every type of business including universities, health insurance companies, retailers ranging from mega to small—any institution that collects data about its customers is vulnerable to attack, and hackers seem to be enjoying a new era of data breaches. One type of breach that is particularly prevalent is hackers gaining access to account information relating to bank accounts, credit card accounts, debit card accounts, and so forth. Typically, a user gets a notice that their account information has been compromised and instruct them to update their account information. The user is also responsible for determining other retailers and places that have the compromised account information and updating the information there as well. This may be a time consuming and arduous task and one that a user does not wish to perform.

SUMMARY

Various embodiments described herein may include a device, a system, and an apparatus, and so forth including a memory to store instructions, and processing circuitry coupled with the memory. The processing circuitry operable to execute the instructions, that when executed, cause the processing circuitry to receive an indication to change payment token information associated with a website comprising one or more webpages, initiate a script comprising one or more rules to cause performance of one or more actions to navigate to a webpage of the one or more webpages of the website to change the payment token information, automatically navigate to the webpage to change the payment token information, and automatically change the payment token information with new payment token information.

Embodiments discussed herein may also include a system to perform computer-implemented method including receiving an indication to change payment token information associated with a website, generating one or more rules to automatically navigate to a webpage to change the payment token information based on an analysis of one or more webpages of the website, storing the one or more rules in a navigation file to perform a change in payment token information, the navigation file comprising the one or more rules to automatically navigate the website to the webpage to change the payment token information in response to being initiated, initiating the navigation file to cause performance of the one or more rules and navigate to the webpage to change the payment token information, and causing a change in the payment token information.

Embodiments may also include A computer-readable storage medium storing computer-readable program code executable by a processor to crawl one or more webpages of a website to generate one or more rules to automatically navigate to a webpage to change payment token information associated with the website, and store the one or more rules in a navigation file to change payment token information, the navigation file, in response to being initiated, to cause performance of the one or more rules to automatically navigate to the webpage to change payment token information.

BRIEF DESCRIPTION OF THE DRAWINGS

FIG. 5A illustrates a fifth example of a processing flow.

FIG. 5B illustrates a sixth example of a processing flow.

FIG. 5C illustrates a seventh example of a processing flow.

DETAILED DESCRIPTION

Figure 1A:
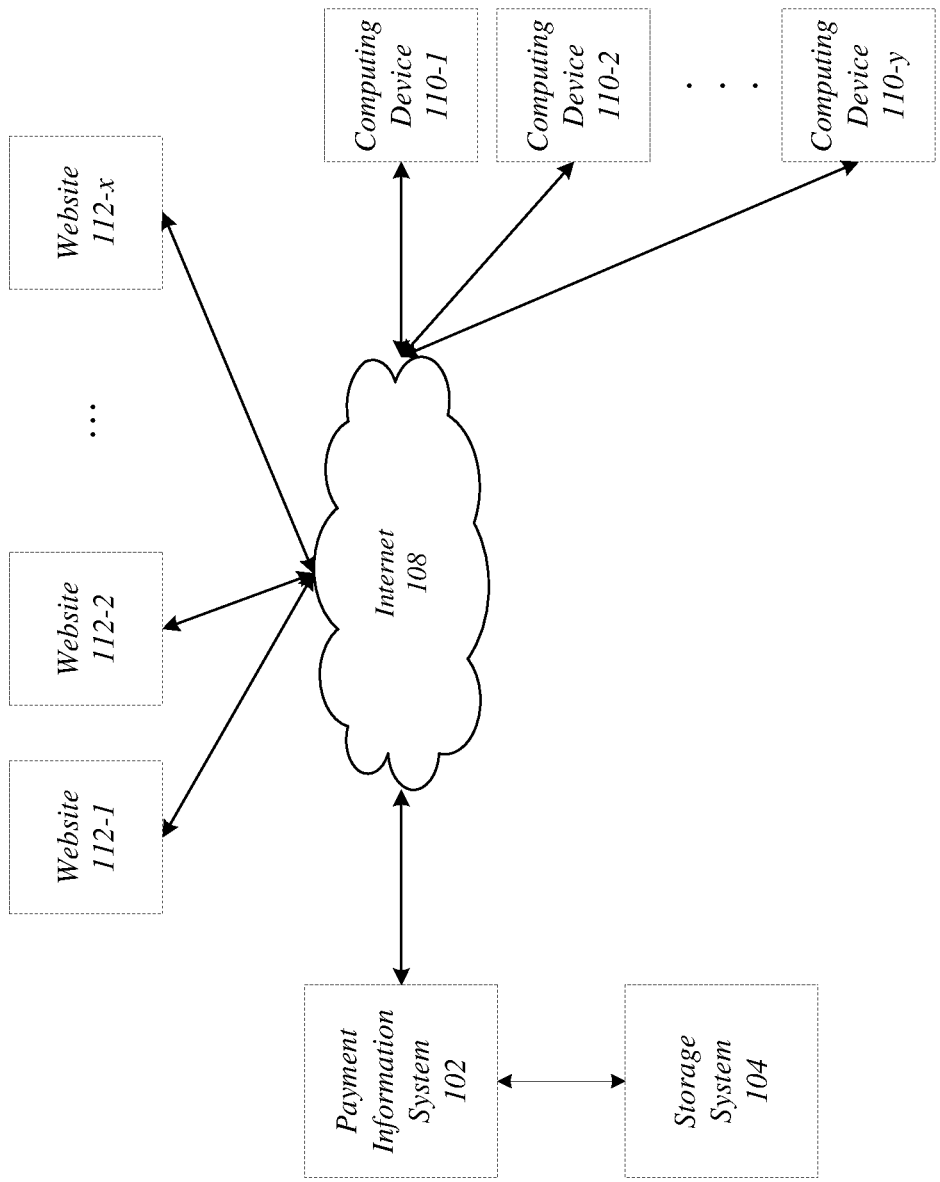
FIG. 1A illustrates an example of a system to provide automatic payment information updates.

Various embodiments are generally directed to systems and operations to perform automatic updates on websites for payment token information, e.g., a virtual credit card number. For example, embodiments include determining an update is required for a website and running or executing one or more scripts to perform the update without any user interaction or with minimal user interaction. The update may include replacing and/or providing a new virtual credit card number that can be used for future transactions via a checkout operation performed on the website. During the update, embodiments include presenting a 'veneer' webpage or screen to a user while the update is occurring in the background. The script may be executed behind the veneer webpage and crawl the website to the particular webpage having the information to be updated. The script may then proceed to update the information. In some instances, for security purposes, a user may be required to enter credentials such that the script may access the personal account information while the script is performing the update. However, in other instances, the scripts may pull the credentials in a secure manner from a secure location, such as a secure server or a stored password section of a web browser.

Embodiments also include systems and operations to generate the one or more rules or instructions of the scripts (or executable) files that are used to perform the automatic updates. These operations may also occur transparently to the user without their knowledge. Moreover, the rules may be generated by navigating to a website including webpage(s) having the payment token information, e.g., a merchant website, analyzing the website, e.g, analyzing the object model and elements to determine how to navigate to a specific webpage having account information and identifying fields having the payment token information. These rules may be generated and/or updated from time-to-time and stored securely on a storage system. These and other details will become more apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example of a system 100 that enables users to pay for goods and services on websites 112 via payment token information, and perform automatic updates of payment information for those websites based on a breach, user requests, system requests, and so forth. For example, the system 100 may including a payment information system 102 that may interact and communicate with websites 112 via the Internet 108 to provide payment for goods and services a user wishes to buy by utilizing payment token information, e.g., a credit card account number, a virtual account number, an account identifier, and so forth. The payment token information may be stored securely on the website 112 in an encrypted manner and may be used to make purchases by linking to a debit or credit card account associated with the user, for example. From time-to-time the payment token information may be updated, e.g., based on a security breach, fraud detection, general security settings (system request), user request, and so forth. The system 100 including the payment information system 102 may enable automatic payment token updates with little or no user interaction and and the updates may occur transparently to the user. In embodiments, the payment information system 102 may be part of one or more systems operated by a bank or credit card company providing financial services.

The payment information system 102 may utilize a set of instruction or rules stored in executable or script files to navigate to webpages of a website 112 to perform an update of payment token information. Further, the payment information system 102 may determine when the instructions or rules for a web site require an update and perform a crawl or analysis of the website including its webpages to determine new instructions or rules.

In embodiments, the payment information system 102 may be coupled with a storage system 104 including one or more data stores to store information and data. The payment information system 102 may utilize the storage system 104 to store the instructions and/or rules to navigate websites 112 to perform the automatic updates, for example. Thus, the payment information system 102 may determine an automatic update is required, retrieve the appropriate instructions or rules from the storage system 104, and perform the update on one or more websites. In another example, the payment information system 102 may generate new or updated instructions or rules to perform an automatic update of payment information and store the newly generated rules in the storage system 104. In some instances, the payment information system 102 and the storage system 104 may be co-located, e.g. within the same structure, on the same network (subnetwork), on the same device or set of devices (servers), and so forth. However, embodiments are not limited in this manner and in some instances, the payment information system 102 and storage system 104 may not be co-located. The storage system 104 may be a cloud-based storage system and may not be located with the payment information system 102, for example.

The system 100 also includes a number of computing devices 110-y, where y may be any positive integer. A computing device 110 may be any type of device capable of connecting with the Internet 108, via wired and/or wireless connections, to interact with websites 112-x, where x may be any positive integer. Note, that in some instances, the websites 112 may be considered part of the Internet 108, but are illustrated separately in FIG. 1 for discussion purposes. In embodiments, a computing device 110 may be utilized by a user to access a website 112 and make purchases via the website 112.

In embodiments, the website 112 may store payment token information that may be used to make the purchases via the website 112. In some instances, as previously discussed, the payment token information may be required to be updated. The payment information system 102 may present a 'veneer' webpage or overlay webpage to the user on the user's computing device 110 to prevent the user from visually seeing the occurrence of the update. In some instances, user may be utilizing a mobile application, e.g., on a mobile phone, and a 'veneer' webpage or screen may be presented in the mobile application as the payment information system navigates to the correct webpage having the payment token information and perform the update. The mobile application may send a message to the operating system of the mobile device, and the operating system may cause a veneer graphic to be displayed on the display the device. The operating system may continue to display the graphical until the mobile application communicates another message indicating the update is complete. In another example, the mobile application may be programmed with one or more routines that are itself initiated when an update is triggered to occur. The mobile application including the one or more routines executing may cause a pre-stored graphic to presented on the display device while the update is occurring.

In some instances, the update may be performed in a web browser and a webpage. During the update, the web browser may be caused to open a new 'tab,' e.g., a javascript code segment may be executed including the "open_in_new_tab (url)" function, where the url points to a graphic or webpage while the update is occurring. The 'tab' may be killed when the update is finished. In another example, invisible i-frames may be utilized to navigate and perform the update. Embodiments are not limited in this manner.

In some instances, the update may be caused and/or performed by a web browser extension, which may cause a 'veneer' webpage or screen to be presented in a window associated with the extension and/or the webpage presented on a display device. The veneer webpage may be any type or kind of webpage or screen capable of preventing the user from seeing navigation and update. For example, the user may be presented a graphic, such as an image, an advertisement, and so forth, in a popup webpage that overlays the website 112 being used to make a purchase. In another example, the veneer webpage may be the webpages that are being navigated by the script, but with a blurring effect applied. These and other details will become more apparent in the following description.

Figure 1B:
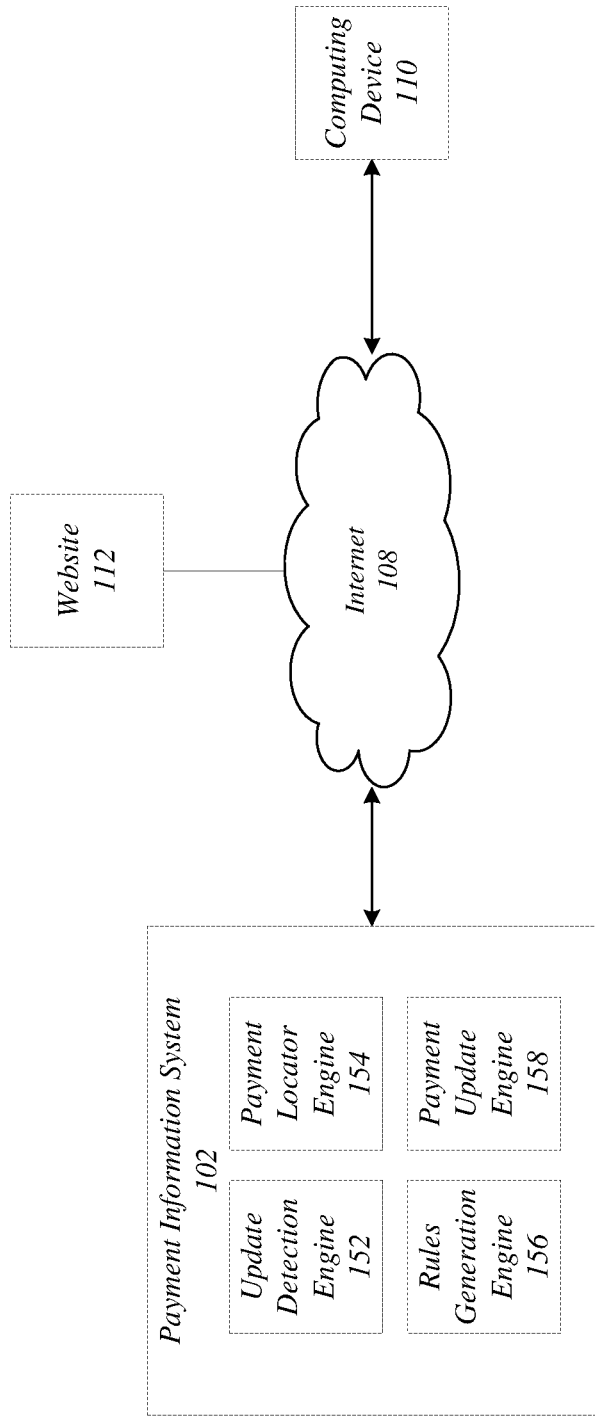
FIG. 1B illustrates a second example of a system to provide automatic payment information updates.

FIG. 1B illustrates an example of system 150, which may be similar to or the same as system 100 of FIG. 1A and include a more detailed view of the payment information system 102 to perform automatic updates of payment token information and generate rules/instructions to perform the updates. The system 150 illustrated in FIG. 1B includes the payment information system 102 and the computing device 110 coupled with one or more website(s) 112 and the Internet 108. As previously discussed, a computing device 110 may be any type of computing device cable of communicating with the Internet 108, website(s) 112, and the payment information system 102, e.g., a personal computer, a mobile computing device, a mobile phone, and so forth.

In embodiments, the payment information system 102 is a computing device or system capable of providing payment services for online goods and servers, perform updates on websites of payment token information, determine instructions and/or rules to automatically perform the payment token information updates, and so forth. The payment information system 102 may include any number of computing devices, such as one or more servers, server farms, computers, and so forth. Moreover, the payment information system 102 includes processors, circuitry, hardware, any number of components, systems, and engines to perform the operations discussed herein. These components, systems, and engines may be implemented in hardware (circuitry) only, software only, and/or a combination thereof.

In the illustrated example, the payment information system 102 includes an update detection engine 152, a breach detection engine 154, a rules generation engine 156, and payment update engine 158. The one or more engines may operate alone or in combination to perform operations discussed herein.

Figure 2B:
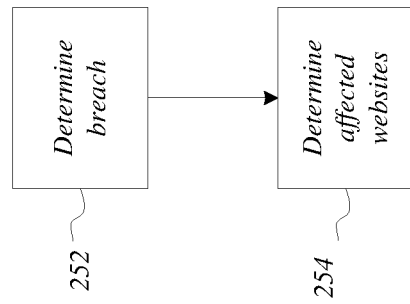
FIGS. 2A/2B illustrate a first and second example of processing flow.
Figure 2A:
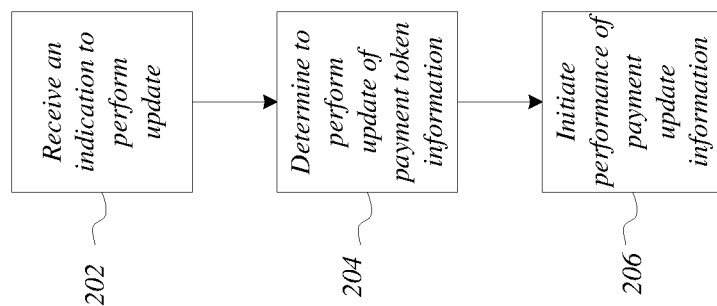

In embodiments, the update detection engine 152 may detect and/or determine when an update of payment token information is required. In one example, the update detection engine 152 may be a service and/or one or more processes executing on the payment information system 102 that may receive an application programming interface (API) message or another type of message from one or more other services indicating an update of payment token information is required. For example, the update detection engine 152 may determine whether a user requested an update or breach, an administrator requested an updated or breach, a breach of secure information occurred (via a retail security breach, online security breach, or otherwise), a periodic update is required, and so forth. FIG. 2A illustrates an example processing flow 200 that may be performed by the update detection engine 152 to detect a required update of payment token information, e.g., an update of a credit card number.

At block 202, the update detection engine 152 may receive an indication to perform an update of payment token information. As discussed, the indication may be received in the form of an API call or message from another service or engine. For example, a user or administrator may cause an update via an input with a graphical user interface (GUI), which may be sent to the update detection engine 152 via the API call or message. In another example, the indication may be received from a service or process operating to detect an occurrence of a security breach, such as a process of the breach detection engine 154. In a third example, the payment information 102 may include processes that cause an automatic update on a periodic or semi-period basis, e.g., every 90 days. Embodiments are not limited to these examples, for example, the update detection engine 152 may receive an update indication based on other factors such as a security policy, a lost/stolen credit/debit card indication, and so forth.

In embodiments, the update detection engine 152 may determine what payment token information is required to be updated at block 204. For example, the indication to perform the update received at block 202 may include an identifier to identify particular payment token information. The update detection engine 152 may utilize the identifier to perform a lookup to determine the specific payment token information stored in storage system 104 and associated websites, e.g., website storing the specific payment token information. Moreover, the update detection engine 152 may determine which websites require the update based on the identifier. For example, the update detection engine 152 may analyze the user's transaction history to determine which websites or physical locations the user may purchases using the specific token. The update detection engine 152 may take into account a number of factors while analyzing the history, e.g., time period of the transactions (places more than 3 years may be excluded).

The update detection engine 152 may also use the information received in the indication and found in the storage system 104 to determine which rules/scripts are required to perform the update. In one example, a database of the storage system 104 may include payment token information for a number of users/customers, and an indication of every website the users have stored on the payment token information. Moreover, the database or data store of the storage system 104 may include an indication of each set of instructions and/or rules that need to be initiated to perform each update for the specific payment token information. Thus, the update detection 152 identify the specific payment token information, determine associated websites having the specific payment token information that is required to be updated, and determine rules/scripts for those websites for the storage system 104. The update detection engine 152 collect or retrieve this information, e.g., perform a database retrieval or get, to be used to perform an update on one or more websites.

At block 206, the update detection engine 152 may initiate performance of an update of payment token information. For example, the update 152 may communicate an API message including information, such as account information, payment token information, website information, executable or script information, and so forth, to another service or engine to cause performance of the update of the payment token information. Embodiments are not limited in this manner. In another example, the update detection engine 152 may initiate an executable or script itself to cause performance of the payment token information.

In some instances, the update detection engine 152 may determine multiple accounts and payment token information is required to be updated. For example, as will discussed in more detail below, the update detection engine 152 may receive an indication of a breach of website having multiple accounts and payment token information. The update detection engine 152 may determine each account and payment token information affected by the breach, each additional website storing the affected payment token information, and scripts to update each of the affected payment token information based on one or more lookups performed in the storage system 104. The update detection engine 152 may cause a mass update of payment token information of each account affected by the breach. In some instances, the update detection engine 152 may determine an order to perform the mass update or may initiate the update concurrently on a number of websites. The order may be based on a number of purchases made a particular retailer, from newest to oldest prior purchases, and so forth.

With reference back to FIG. 1B, the payment information system 102 includes a breach detection engine 154. The breach detection engine 154 may be one or more processes that monitor the activity of other websites, receive information or an indication of a breach and provide a breach indication to the update detection engine 152 to perform an automatic update. FIG. 2B illustrates an example of a processing flow 250 to process detection of a security breach by the breach detection engine 154. At block 252, the breach detection engine 154 may determine and/or receive information that a security breach has occurred on a particular website and/or affected a particular account. For example, the breach detection engine 154 may receive an API message indicating that a website was hacked, secret/confidential information was released, payment token information was leaked, and so forth. In this example, the breach may affect one or more accounts associated with the website. In another example, the breach detection engine 154 may receive an API message indicating that a particular account was breached. In this example, the breach detection engine 154 receives an indication of a breach based on an indication provided by a user as part of an authentication process. Thus, a breach may affect any number of accounts based on a website breach and/or a single account for a particular user and embodiments are not limited in this manner.

At block 254, the breach detection engine 154 may indicate that a breach has occurred and provide information to other engines, e.g., the update detection engine 152, about the breach. For example, the breach detection engine 154 may send or communicate via an API message an indication that a breach occurred and an indication of the affected website. In this example, the update detection engine 152 may utilize the indication of the affected website to perform a lookup in a database to determine affected accounts and other affected websites, e.g., websites that store the affected payment token information. In another example, the breach detection engine 154 may send or communicate via an API message an indication of the breach and an indication of account affected by a localized breach. The update detection engine 152 may utilize this information to perform a lookup to determine affected payment token information and affected websites to perform an update, as previously discussed.

In embodiments, a breach may be detected based on information from one or more public resources, e.g., a online newspaper, an electronic mail, an online public statement, etc. A breach may also be detected by the breach detection engine 154 based on an attempt of a merchant-specific virtual number being utilized at another merchant. The merchant-specific virtual number may be a number only permitted to be used by a particular merchant; and therefore, an attempt to use it else may indicate that the number has been compromised.

In some instances, the breach detection engine 154 may perform additional remedial and notification operations. For example, the breach detection engine 154 sends and/or causes a notification of a breach to be sent (pushed) to all mobile devices having accounts affected by the breach, send emails associated with the affected accounts, cause a banner to presented in a webpage of a website, lock or prevent the number from being utilized, and so forth. These indications may include information informing users of the breach and that an automatic update is occurring or going to occur. In other instances, the breach detection engine 154 may require a user input to cause the automatic update, e.g., present a notification on a display of a mobile device for a user to accept and/or decline the automatic update. Embodiments are not limited in this manner.

With reference back to FIG. 1B, the payment information system 102 includes a rules generation engine 156 that may be used to generate rules and/or instructions to perform the update of payment token information. In embodiments, the rules generation engine 156 may generate new rules and/or instructions to perform updates of a payment token information for a new or unknown website and may perform updates to already generated rules and/or instructions based on a change in a website.

Figure 3A:
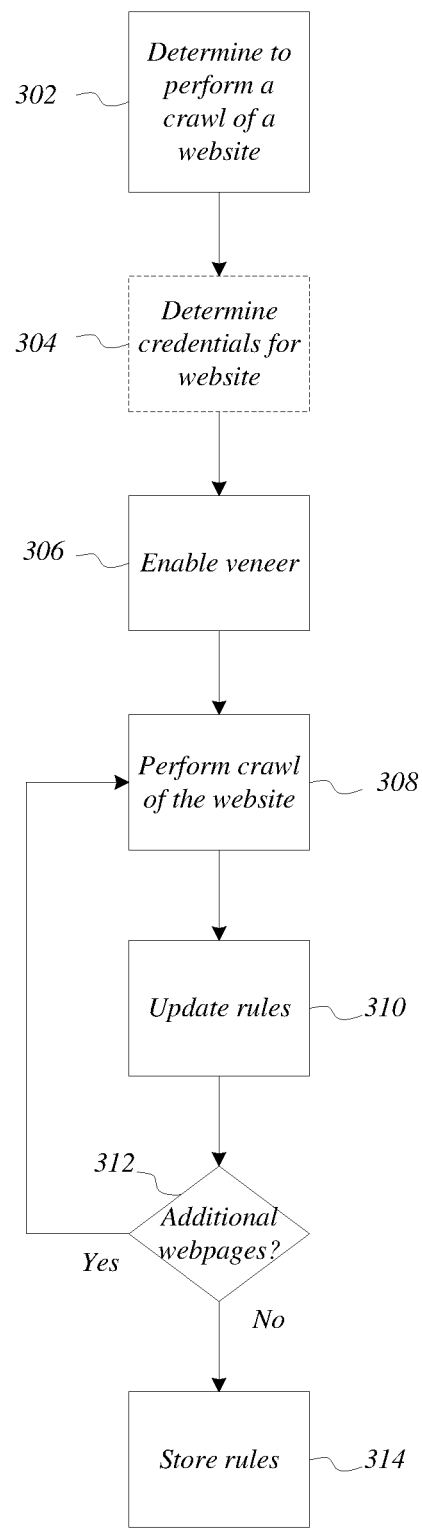
FIG. 3A illustrates a third example of a processing flow.

FIG. 3A illustrates an example of a processing flow 300 including operations that may be performed by the payment information system 102 including the rules generation engine 156 to generate and update rules and/or instructions to perform automatic payment token information updates.

At block 302, the rules generation engine 156 determines to perform a crawl or scrape of a website to generate one or more rules. For example, the rules generation engine 156 may receive an indication, such as an API message or call, indicating that a crawl of a website is required. In some instances, the crawl may be performed when a new website to store payment token information is detected. In other instances, the crawl may be performed as an update when a change is detected with a website. The rules generation engine 156 may also perform a crawl on a periodic or semi-periodic basis, which may be based on customer activity, e.g., websites that have more customer activity may be crawled more often than websites that have less or low customer activity.

At block 304, the rules generation engine 156 may perform a crawl of a website to generate a script of rules or instructions that may be used to perform automatic updates. For example, the rules generation engine 156 may analyze the hypertext markup language (HTML) code, extensible HTML (XHTML) code, extensible markup language (XML), and so forth to determine how to navigate to a website and the webpage(s) having the payment token information, e.g., a virtual credit card. More specifically, the rules generation engine 156 may examine each line of code and each element in each line of code to determine how to navigate to the payment token information webpage, e.g., identify labels for elements indicating account information, payment information, etc. For example, the rules generation engine 156 may access the underlying code of a website to determine how to crawl to the correct webpage via an object model, such as the Document Object Model (DOM) interface for HTML and XML. The object model provides an API for the webpages of the website that enables programs, such as web browsers, to access and manipulate the webpage's content. The object model may provide a tree-like structure ("node-tree"), having a root and a number of elements with labels. The rules generation engine 156 may look for code that specifies or links to the webpage associated with the payment token information, e.g., under account and payment options section. The payment token information is identified as such in the code, e.g., by the labels of the elements of the object model. The rules generation engine 156 may determine fields associated with the payment token information based on field(s) storing payment token information and/or label(s) of the element(s) identifying the payment token information. Thus, the rules generation engine 156 may crawl, e.g., go from webpage-to-webpage, via the object model and look for information that may require to be updated. The one or more rules generated for the script file are used by the payment information system 102 to navigate to the account webpage of the website.

In embodiments, the rules generation engine 156 may analyze each webpage associated with a website to determine rules to navigate and change the payment token information. At block 306, the rules generation engine 156 may determine and/or update rules to navigate a particular webpage. These updates or new rules may be stored in a script file and used to navigate to change payment token information at a later point in time. Further and at block 308, the rules generation engine 156 may determine if any webpages of the website remain to analyze to generate rules. For example, the rules generation engine 156 may determine whether the webpage including the payment token information has been analyzed. If webpages of the website remain to be analyzed, the rules generation engine 156 may further navigate to a different webpage to reach the webpage including the payment token information. However, if all of the webpages of the website have been analyzed, the rules generation engine 156 may finalize and store the rules at block 310, e.g., in the storage system 104.

Figure 3B:
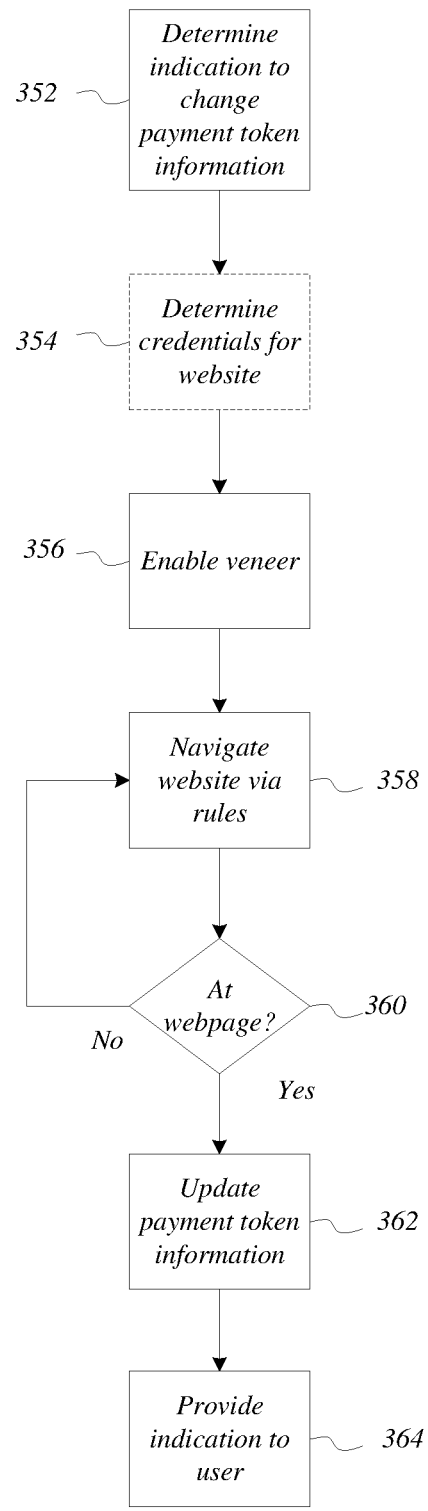
FIG. 3B illustrates a fourth example of a flow chart.

With reference back to FIG. 1B, the payment information system 102 includes a payment update engine 158 that may be used to update payment token information. FIG. 3B illustrates one example of a processing flow 350 to update payment token information. At block 352, the payment update engine 158 may determine to perform an update for payment token information. For example, the payment update engine 158 may receive an indication based on a breach of confidential information including payment token information. At block 354, the payment update engine 158 may determine credentials to access an account area of a website having the payment token information. The payment update engine 158 may prompt, e.g., present a webpage, to enter the credentials to access the account area. The credentials may be a username and password for a particular website. In other instances, the payment update engine 158 may retrieve the credentials from a secure storage area, e.g., the storage system 104. In this example, the credentials may be stored in a secure or encrypted manner and may not be known or discoverable by the payment information system 102 itself. Only at the server(s) associated with a particular website will the credentials be decrypted for use to perform the automatic update. In a third example, the credentials may be stored and retrieved from a web browser, e.g., the stored password section of CHROME® or INTERNET EXPLORER®. Thus, the payment information system 102 and storage system 104 may not store the credentials itself, at least not in a decrypted manner, and be susceptible to an attack.

At block 356, the payment update engine 156 may enable a veneer webpage or screen to the automatic payment token information update. For example, the veneer webpage may be presented on a display to the user to block the user from visually seeing the update of the payment token information. The veneer webpage may be a blank webpage and/or include information, e.g., an advertisement, a logo, a symbol, and so forth. In some instances, the update may be performed via a mobile application, and a 'veneer' screen of the mobile application may present to the user while the update/navigation is occurring. In a third example, a web browser extension may be performing the update, and the veneer may be presented in a window associated with the extension.

At block 358, the payment update engine 156 may perform the update and navigate the website via the rules. For example, the payment update engine 156 may go to a website via an address, and to a particular webpage having the payment token information. At decision block 360, the payment update engine 156 may determine whether a particular website includes the payment token information. If not, the payment update engine 156 may continue to navigate to the correct webpage. If the payment update engine 156 determines that it's on the correct webpage, e.g., the webpage including the payment token information, the payment update engine 156 may cause an update to the payment token information, e.g., replace a credit card number with a new credit card number at block 362. For example, the payment update engine 156 may determine each element having the payment token information on the webpage and provide the correct information in these elements. The elements may be labeled and/or identified and stored in the script files. Further and at block 364, the payment update engine 156 may notify the user of the automatic update performed.

Figure 4A:
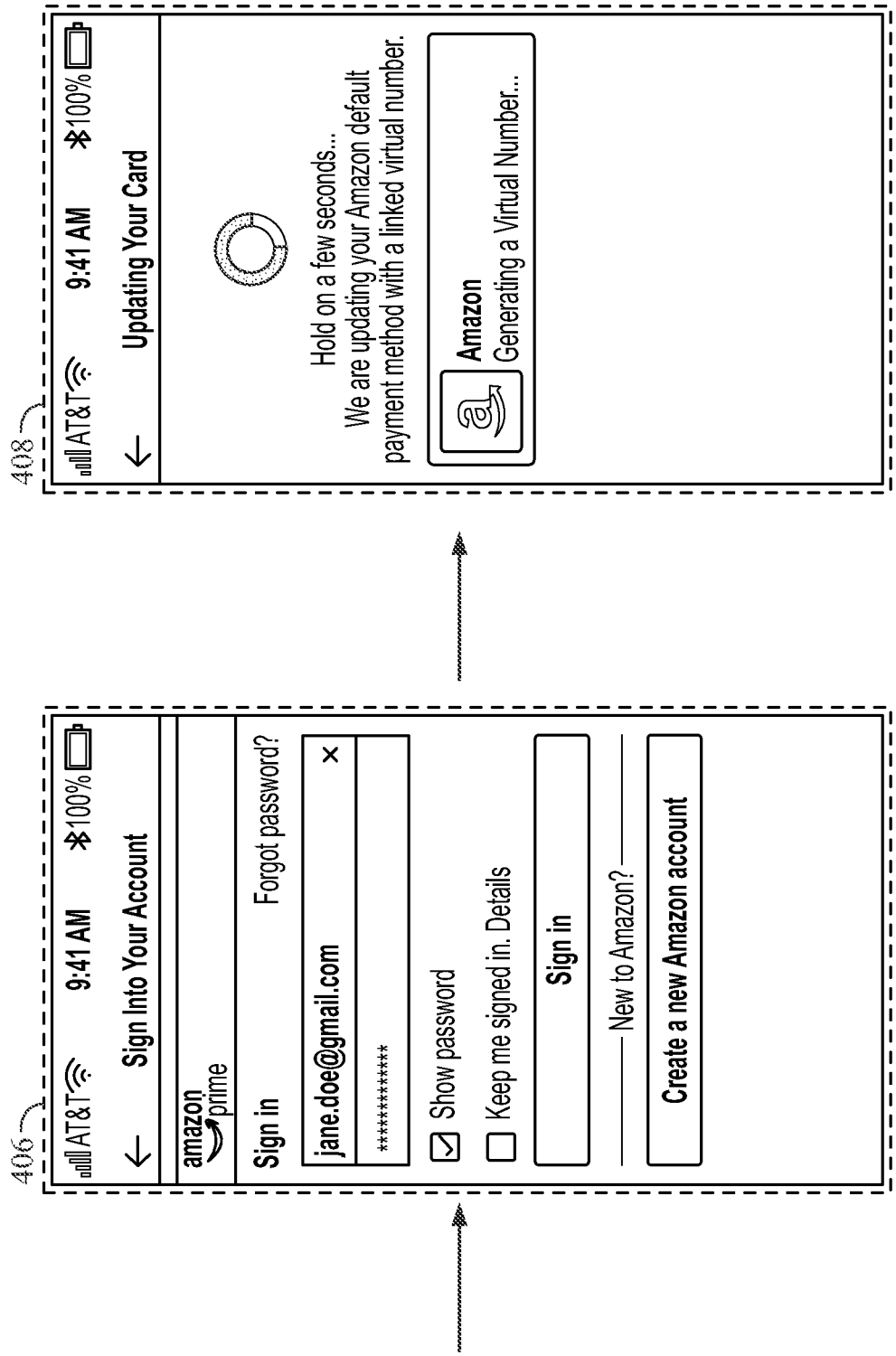
FIG. 4A illustrates a first example of a first sequence diagram of automatic payment information updates.
Figure 4A:
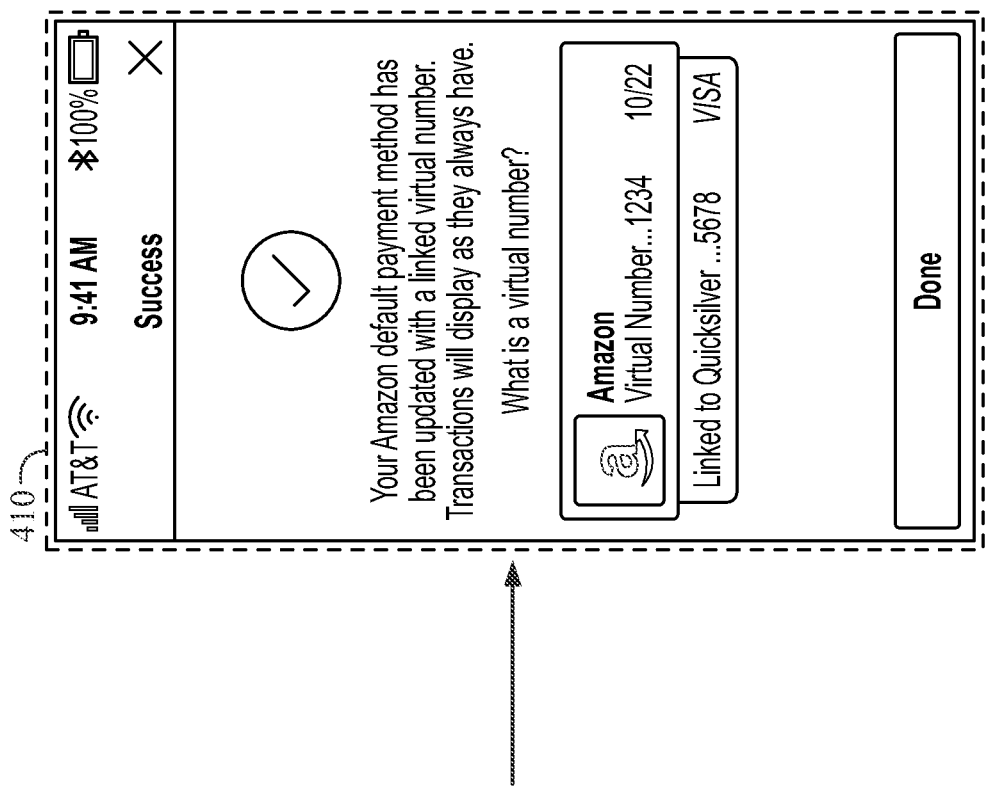

FIG. 4A illustrates an example of a processing flow 400 to perform an update of payment token information. The illustrated example includes graphical user interfaces (GUIs) displays that may be presented to a user while the automatic update is occurring. In this example, the GUIs may be presented to a user on a display of a mobile device. However, embodiments are not limited to this example, and webpages may be displayed on any type of display, e.g., within a window of a web browser operating on a personal computer.

At 402, a user may be presented with a first GUI display to indicate that payment token information, e.g., a virtual credit card number, is being generated and saved for a website. At 404, a user may be presented with a list of one or more websites that may be updated with new payment token information. The one or more websites may include a previous or old version of payment token information associated with an account for the user. The user may be select a particular website via an input. In some embodiments, the website may be presented in an order, e.g., based on frequency of use, and be ordered from most to least usage. At 406, the user may be prompted to enter their credential information to access the account area, e.g., the webpage including the payment token information, of the website. At 408 a user may be presented with a veneer webpage while the payment information system 102 makes an automatic update of payment token information. At 410, a user may be presented with a display indicating that the update is complete.

Figure 4B:
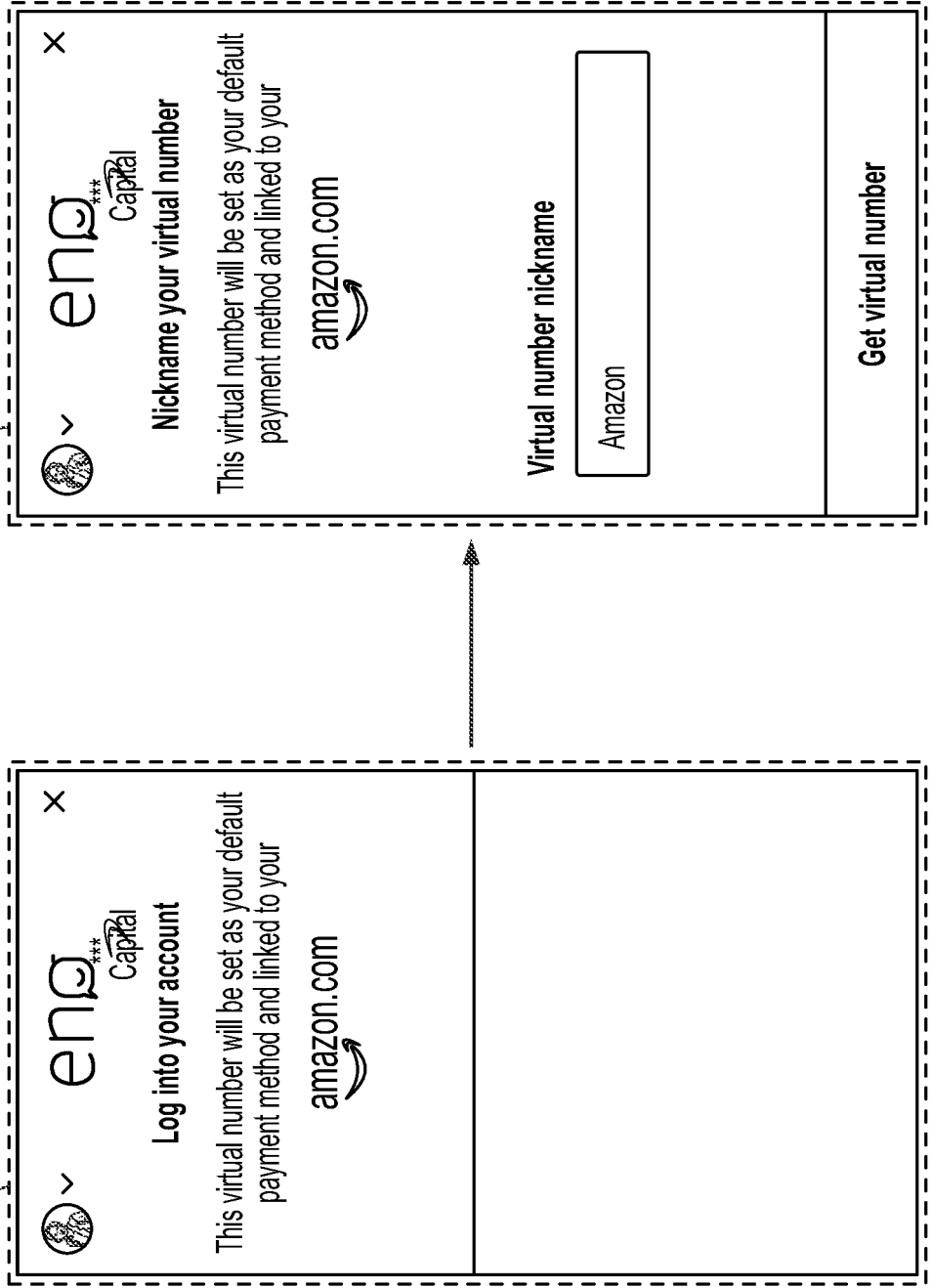
FIG. 4B illustrates a second example of a second sequence diagram of automatic payment information updates.

FIG. 4B illustrates another example of a processing flow 450 including displays that may be presented to a user in a web browser when an automatic update is being performed. At 452 a user may be presented a first display asking a user to log into an account for a specific website. As previously mentioned, in some embodiments a user enters the credentials, and in other embodiments, the credentials may be stored and/or automatically retrieved to access an account area of a webpage. For example, the credentials may be stored in a storage system 104 associated with the payment information system 102. In another example, the credentials may be retrieved from stored credentials of a web browser.

At 454 a user may be presented with a display to generate a name for payment token information, e.g., a virtual credit card number. Once a user enters the name, the payment information system may automatically generate payment token information and automatically update a website with the newly generated payment token information at block 456. At block 458, a user may be presented with a display indicating the update is complete and with the new payment token information.

FIG. 5A illustrates an example of a logic flow 500 that may be representative of some or all the operations executed by one or more embodiments described herein. For example, the logic flow 500 may illustrate operations performed by a payment information system.

At block 505, embodiments include receiving an indication to change payment token information associated with a website comprising one or more webpages. The indication may be based on a detection of a breach, a user/administrator setting, and so forth. In embodiments, the indication may be an API messages including information relating to the website, e.g., which website, and the associated payment token information.

At, block 510, the processing flow 500 includes initiating a script comprising one or more rules to cause performance of one or more actions to navigate to a webpage of the one or more webpages of the website to change the payment token information. The script may be for the specific website and the rules may be steps to navigate to the webpage including the payment token information, e.g., an account webpage.

AT block 515, the processing flow includes automatically navigating to the webpage to change the payment token information. For example, the payment information system 102 may using the script comprising the rules to move to the webpage of the website having the payment token information. The rules may include specific instructions such as providing information, cause a button input on a specific button, and so forth.

At block 520, embodiments include automatically changing the payment token information with new payment token information, e.g., with a new virtual number that is linked to an account associated with the user.

FIG. 5B illustrates an example of a logic flow 540 that may be representative of some or all the operations executed by one or more embodiments described herein. For example, the logic flow 540 may illustrate operations performed by a payment information system to determine rules to automatically navigate a website.

At block 545, the logic flow 540 includes receiving an indication to change payment token information associated with a website. Further, the payment information system may determine that rules are required to make the change. AT block 550, embodiments include generating one or more rules to automatically navigate to a webpage to change the payment token information based on an analysis of one or more webpages of the website.

At block 555, the logic flow 540 includes storing the one or more rules in a navigation file to perform a change in payment token information, the navigation file comprising the one or more rules to automatically navigate the website to the webpage to change the payment token information in response to being initiated. In embodiments, the navigation file may be script including the rules. However in other instances, the navigation file may include executable instructions and embodiments are not limited in this manner.

At block 560, the logic flow 540 includes initiating the navigation file to cause performance of the one or more rules and navigate to the webpage to change the payment token information, and at block 565 includes causing a change in the payment token information, e.g., navigating to at least one particular webpage including the payment token information, determine one or more fields (elements) for the payment token information, and updating the one or more fields with new payment token information.

The payment token information is then saved on the website for future use. In some instances, a 'test' charge may be made using the new payment token information. For example, a one-cent charge may be attempted to be sent through the website using the payment token information. The payment information system may acknowledge the test charge went through or not. If the charge goes through, the payment information system may determine that the information has successfully updated. If the charge does not go through, the payment token information may determine that the update failed and perform remedial operations, e.g., do another scrap to update the rules and perform the change again with the new updated rules. Embodiments are not limited in this manner.

FIG. 5C illustrates an example of a logic flow 580 that may be representative of some or all the operations executed by one or more embodiments described herein. For example, the logic flow 580 may illustrate operations performed by a payment information system to determine rules to automatically navigate a website.

At block 585, the logic flow 580 includes crawling one or more webpages of a website to generate one or more rules to automatically navigate to a webpage to change payment token information associated with the website. For example, a veneer webpage may be presented to a user in a web browser, web browser extension, a mobile application, and so forth. In the background, the crawl may navigate to the website and the one or more webpages associated with the payment token information. The payment information system may go to the website via utilization of a HyperText Transfer Protocol (HTTP) or HTTP secure (HTTPS) address and then to the correct webpages analyzing the object models and elements of each webpage of the website Moreover, the payment information system may look at each element of each webpage and perform one or more actions, e.g., go to another webpage, determine elements associated with token information via element labels, and so forth. Further and at block 590 embodiments include storing the one or more rules in a navigation file or script to change payment token information, the navigation file, in response to being initiated, to cause performance of the one or more rules to automatically navigate to the webpage to change payment token information. For example, the payment information system may store each step required to navigate to the website, the webpage(s) associated with the payment token information, the identifiers or labels of the payment token information elements, and so forth.

Figure 6:
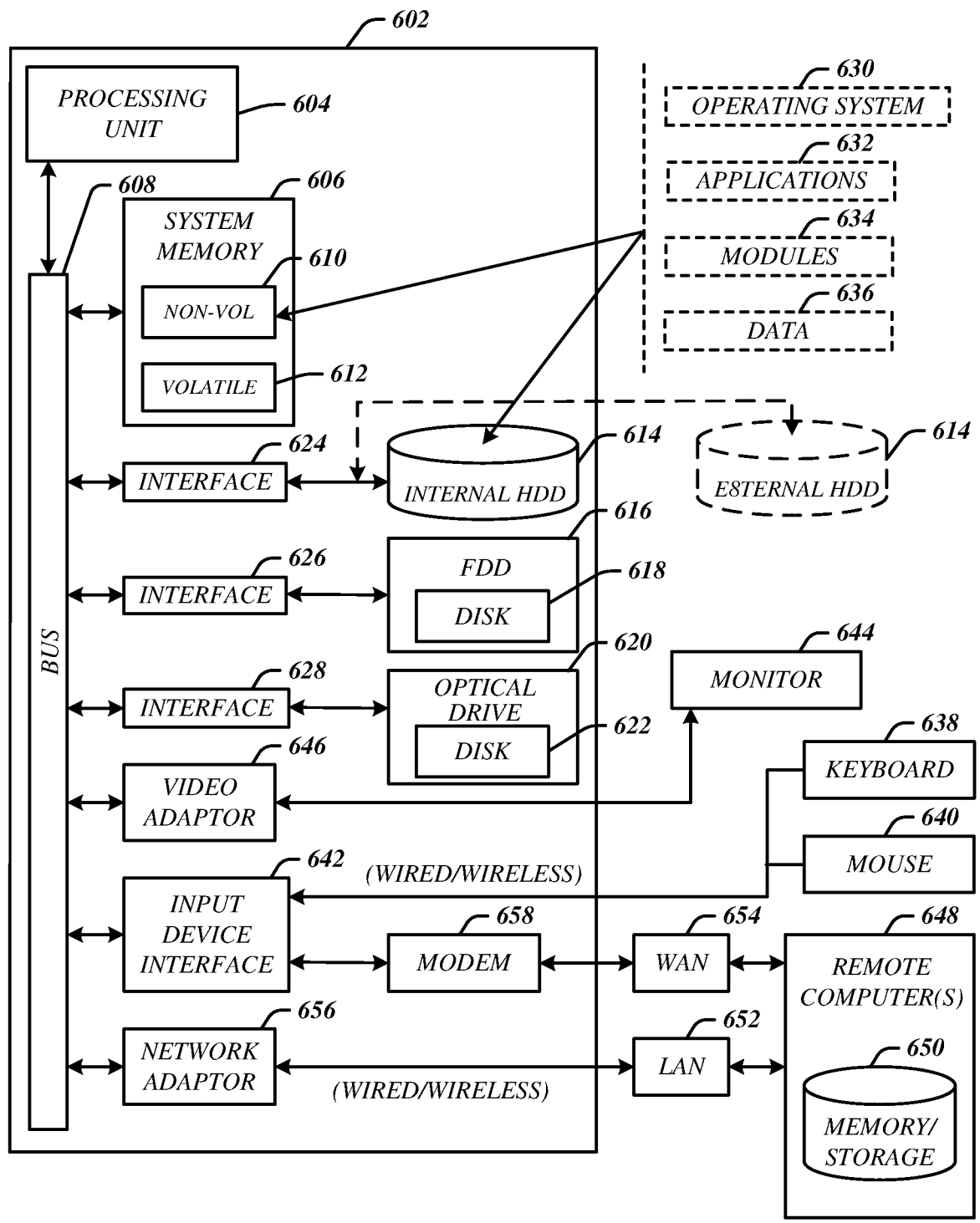
FIG. 6 illustrates an example of a computing architecture.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5C may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
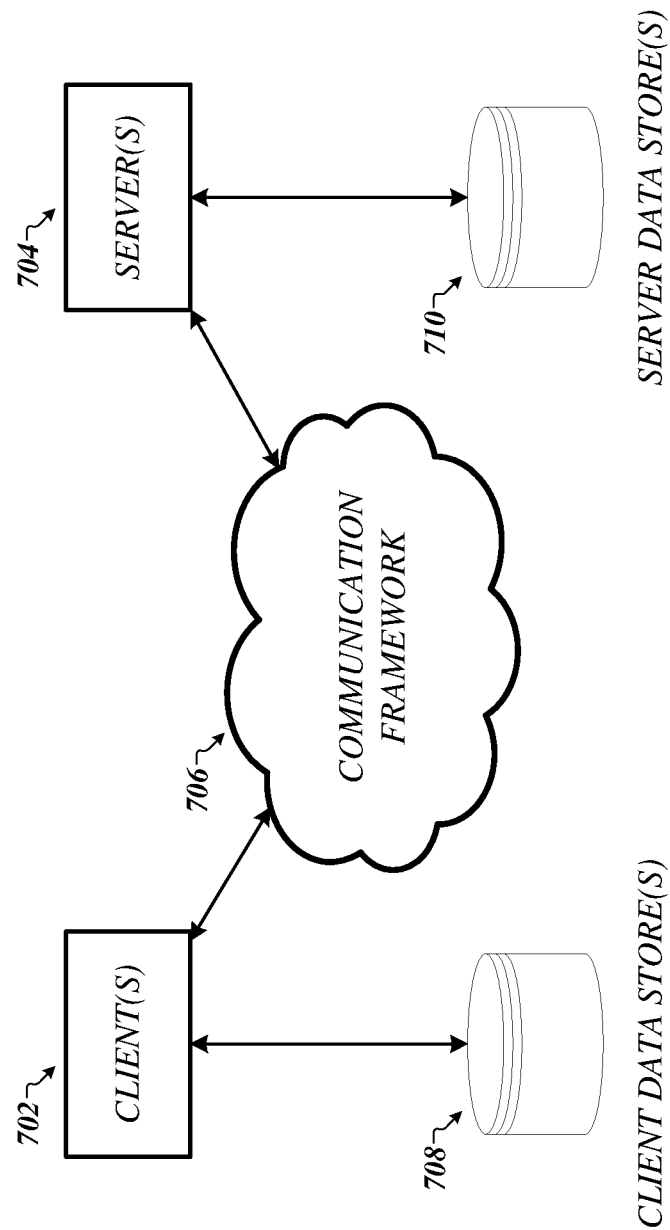
FIG. 7 illustrates an example of a communications architecture.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement one or more devices of FIG. 1, e.g., payment information 102. The clients 702 and the servers 704 are operatively connected to one or more respective client data stores 706 and server data stores 710 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 8:
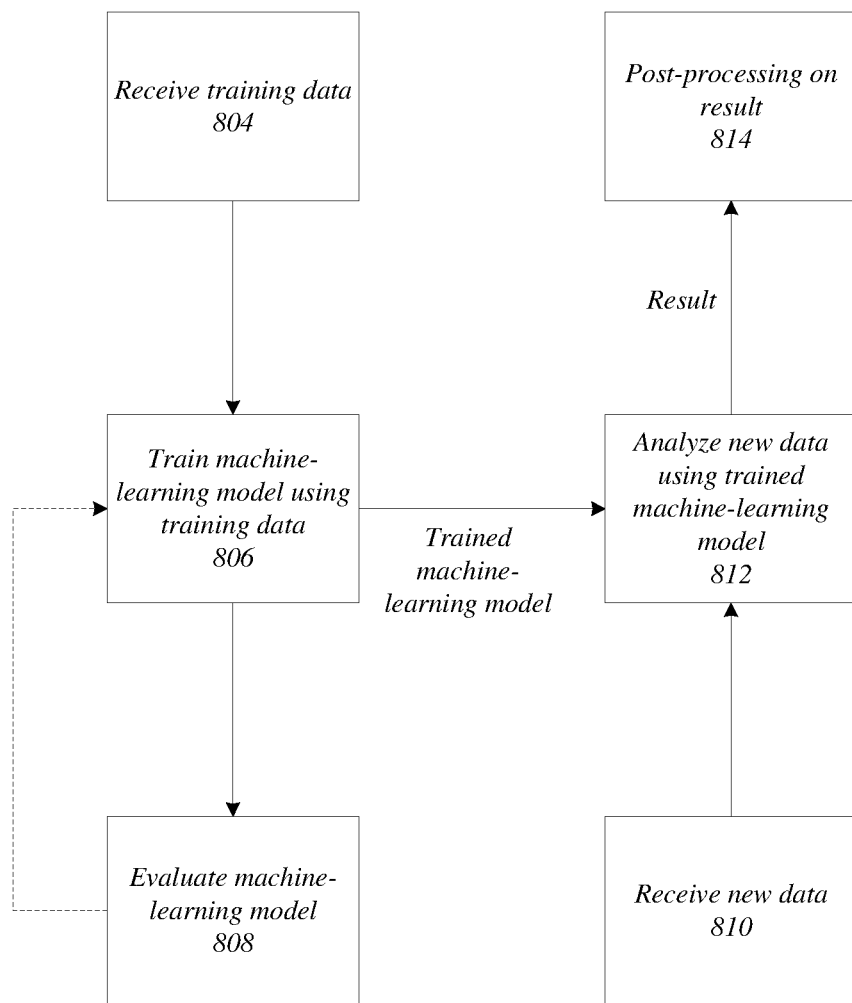
FIG. 8 illustrates an example of a machine-learning processing flow.

FIG. 8 is a flow chart of an example of a process 800 for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 8.

In block 804, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data to determine and/or provide context for navigating a website to a specific webpage, e.g., a webpage associated with account information. The data may be used to train the model to crawl a website to generate one or more rules to for automatic navigation.

In block 806, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 808, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 806, where the machine-learning model can be further trained using additional training data or otherwise modified to improve accuracy. If the machine-learning model has an adequate degree of accuracy for the particular task, the process can continue to block 810.

In block 810, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 812, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 814, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most affectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A mobile device, comprising:
a memory to store a mobile application comprising instructions; and
processing circuitry, coupled with the memory, operable to execute the instructions, that when executed, cause the mobile application on the processing circuitry to:
process an indication to change payment token information associated with a website, the website comprising webpages;
in response to the indication to change payment information, automatically enable a veneer screen to present in a display of the mobile application, the veneer screen to overlay an automated navigation to a webpage of the webpages, wherein the webpage comprises payment token information, and the veneer screen to prevent visual display of the automated navigation to the webpage;
initiate a script comprising one or more rules to cause performance of one or more actions to perform the automated navigation to the webpage to change the payment token information;

automatically navigate to the webpage to change the payment token information when the veneer screen is presented in the display of the mobile application;
cause the change of the payment token information with new payment token information in the webpage;
detect a completion of the change of the payment token information with the new token information; and
in response to the completion of the change of the payment token information, automatically disable the veneer screen in the display of the mobile application.

2. The mobile device of claim 1, the mobile application to:
determine one or more fields of the webpage associated with the payment token information; and
automatically cause via the mobile application, the change of the payment token information with the new payment token information by replacing information in the one or more fields of the webpage.

3. The mobile device of claim 1, wherein the indication to change the payment token information based on an indication of a security breach occurrence affecting the payment token information.

4. The mobile device of claim 1, the mobile application to receive the indication to change the payment token based on a security breach of a second website affecting the payment token information.

5. The mobile device of claim 1, the mobile application to cause a prompt to be presented in a display of the mobile application for a user to input one or more credentials to enable access to an account associated with the payment token information and the website to change the payment token information.

6. The mobile device of claim 1, wherein the veneer screen to apply a blurring effect in the display to overlay the automated navigation to the webpage.

7. The mobile device of claim 1, wherein the veneer screen comprises an advertisement graphic to present in the display, the advertisement graphic to overlay the automated navigation to the webpage.

8. The mobile device of claim 1, wherein the payment token information comprises one or more of a virtual credit card number, an address, an expiration date, a user name.

9. A computer-implemented method, comprising:
receiving and processing, by a mobile application of a mobile phone device, an indication to change payment token information associated with a website, the website comprising webpages;
in response to the indication to change payment information, automatically enabling, by the mobile application, a veneer screen to present in a display of the mobile application, the veneer screen to overlay an automated navigation to a webpage of the webpages, wherein the webpage comprises payment token information, and the veneer screen to prevent visual display of the automated navigation to the webpage;
initiating, by the mobile application, a script comprising one or more rules to cause performance of one or more actions to perform the automated navigation to the webpage to change the payment token information;
automatically navigating, by the mobile application, to the webpage to change the payment token information when the veneer screen is presented in the display of the mobile application;
causing, by the mobile application, the change of the payment token information with new payment token information in the webpage;
detecting a completion of the change of the payment token information with the new token information; and
in response to the completion of the change of the payment token information, automatically disabling the veneer screen in the display of the mobile application.

10. The computer-implemented method of claim 9, comprising:
determining, by the mobile application, one or more fields of the webpage associated with the payment token information; and
automatically causing, via the mobile application, the change of the payment token information with the new payment token information by replacing information in the one or more fields of the webpage.

11. The computer-implemented method of claim 9, wherein the indication to change the payment token information based on an indication of a security breach occurrence affecting the payment token information.

12. The computer-implemented method of claim 9, comprising receiving, by the mobile application, the indication to change the payment token based on a security breach of a second website affecting the payment token information.

13. The computer-implemented method of claim 9, comprising causing, by the mobile application, a prompt to be presented in a display of the mobile application for a user to input one or more credentials to enable access to an account associated with the payment token information and the website to change the payment token information.

14. The computer-implemented method of claim 9, wherein the veneer screen to apply a blurring effect in the display to overlay the automated navigation to the webpage.

15. The computer-implemented method of claim 9, wherein the veneer screen comprises an advertisement graphic to present in the display, the advertisement graphic to overlay the automated navigation to the webpage.

16. The computer-implemented method of claim 9, wherein the payment token information comprises one or more of a virtual credit card number, an address, an expiration date, a user name.

17. A non-transitory computer-readable storage medium storing computer-readable program code executable by a processor to:
receive and process an indication to change payment token information associated with a website, the website comprising webpages;
in response to the indication to change payment information, automatically enable a veneer screen to present in a display, the veneer screen to overlay an automated navigation to a webpage of the webpages, wherein the webpage comprises payment token information, and the veneer screen to prevent visual display of the automated navigation to the webpage;
initiate a script comprising one or more rules to cause performance of one or more actions to perform the automated navigation to the webpage to change the payment token information;
automatically navigate to the webpage to change the payment token information when the veneer screen is presented in the display of the mobile application;
cause the change of the payment token information with new payment token information in the webpage;
detect a completion of the change of the payment token information with the new token information; and
in response to the completion of the change of the payment token information, automatically disable the veneer screen in the display of the mobile application.

18. The non-transitory computer-readable storage medium of claim 17, the processor to:
   determine one or more fields of the webpage associated with the payment token information; and
   automatically cause the change of the payment token information with the new payment token information by replacing information in the one or more fields of the webpage.

19. The non-transitory computer-readable storage medium of claim 17, wherein the veneer screen to apply a blurring effect in the display to overlay the automated navigation to the webpage.

20. The non-transitory computer-readable storage medium of claim 17, wherein the veneer screen comprises an advertisement graphic to present in the display, the advertisement graphic to overlay the automated navigation to the webpage.

\* \* \* \* \*